United States Patent
MacKenna et al.

[11] Patent Number: 6,154,793
[45] Date of Patent: Nov. 28, 2000

[54] DMA WITH DYNAMICALLY ASSIGNED CHANNELS, FLEXIBLE BLOCK BOUNDARY NOTIFICATION AND RECORDING, TYPE CODE CHECKING AND UPDATING, COMMANDS, AND STATUS REPORTING

[75] Inventors: Craig MacKenna, Los Gatos, Calif.; Gyle Yearsley, Boise, Id.

[73] Assignee: Zilog, Inc., Campbell, Calif.

[21] Appl. No.: 08/847,169

[22] Filed: Apr. 30, 1997

[51] Int. Cl.[7] .............................. G06F 13/28; G06F 13/42; G06F 13/364

[52] U.S. Cl. ................................ 710/23; 710/22; 710/26; 710/28; 710/10; 710/19

[58] Field of Search .................................. 395/842–848, 395/853–855; 710/10, 19, 22, 23, 26, 28

[56] References Cited

U.S. PATENT DOCUMENTS

| | | | |
|---|---|---|---|
| 3,597,743 | 8/1971 | William | 395/822 |
| 4,549,263 | 10/1985 | Calder | 395/841 |
| 4,901,234 | 2/1990 | Heath et al. | 395/860 |
| 4,989,113 | 1/1991 | Hull, Jr. et al. | 710/22 |
| 5,329,634 | 7/1994 | Thompson | 395/500 |
| 5,349,690 | 9/1994 | Frame et al. | 710/107 |
| 5,448,702 | 9/1995 | Garcia, Jr. et al. | 395/280 |
| 5,530,901 | 6/1996 | Nitta | 395/848 |
| 5,696,989 | 12/1997 | Miura et al. | 710/24 |
| 5,708,779 | 1/1998 | Graziano et al. | 395/200.8 |
| 5,717,952 | 2/1998 | Christiansen et al. | 395/842 |
| 5,752,081 | 5/1998 | Jirgal | 395/842 |
| 5,781,799 | 7/1998 | Leger et al. | 395/842 |
| 5,805,778 | 9/1998 | Suzuki | 395/115 |
| 5,805,927 | 9/1998 | Bowes et al. | 395/843 |
| 5,828,901 | 10/1998 | O'Toole et al. | 395/842 |

FOREIGN PATENT DOCUMENTS

405053968  3/1993  Japan.

OTHER PUBLICATIONS

Physical Address Registers for a Fibre Channel Protocol Chip, Oct. 1994, p607–608, IBM TDB, vol. 37, No. 10.

Bourke et al., Input/Output Channel Address Assignment Mechanism, Jul. 1984, p1115–1118, IBM TDB, vol. 27, No. 2.

Direct Memory Access in a Multitasking Environment, Jun. 1987, p337–339, IBM TDB, vol. 30, No. 1.

*Primary Examiner*—Thomas C. Lee
*Assistant Examiner*—Ilwoo Park
*Attorney, Agent, or Firm*—Majestic, Parsons, Siebert & Hsue

[57] ABSTRACT

An improved DMA controller is provided. The improved DMA controller uses a peripheral control bus which has scan codes to indicate the DMA channel, conventional data request/data acknowledge lines, and additional lines indicating a "terminate," "type fetch," "end of buffer" and "store status." List entries are associated with the buffers in the memory. Each list entry has a type/status field which can be coded with information indicating "ready buffer," whether to notify "end of buffer," "buffer in progress," "completed buffer without status," "completed buffer with status," "ready buffer with command," and "ready buffer without command." The type of status byte can be checked before processing the buffers.

23 Claims, 5 Drawing Sheets

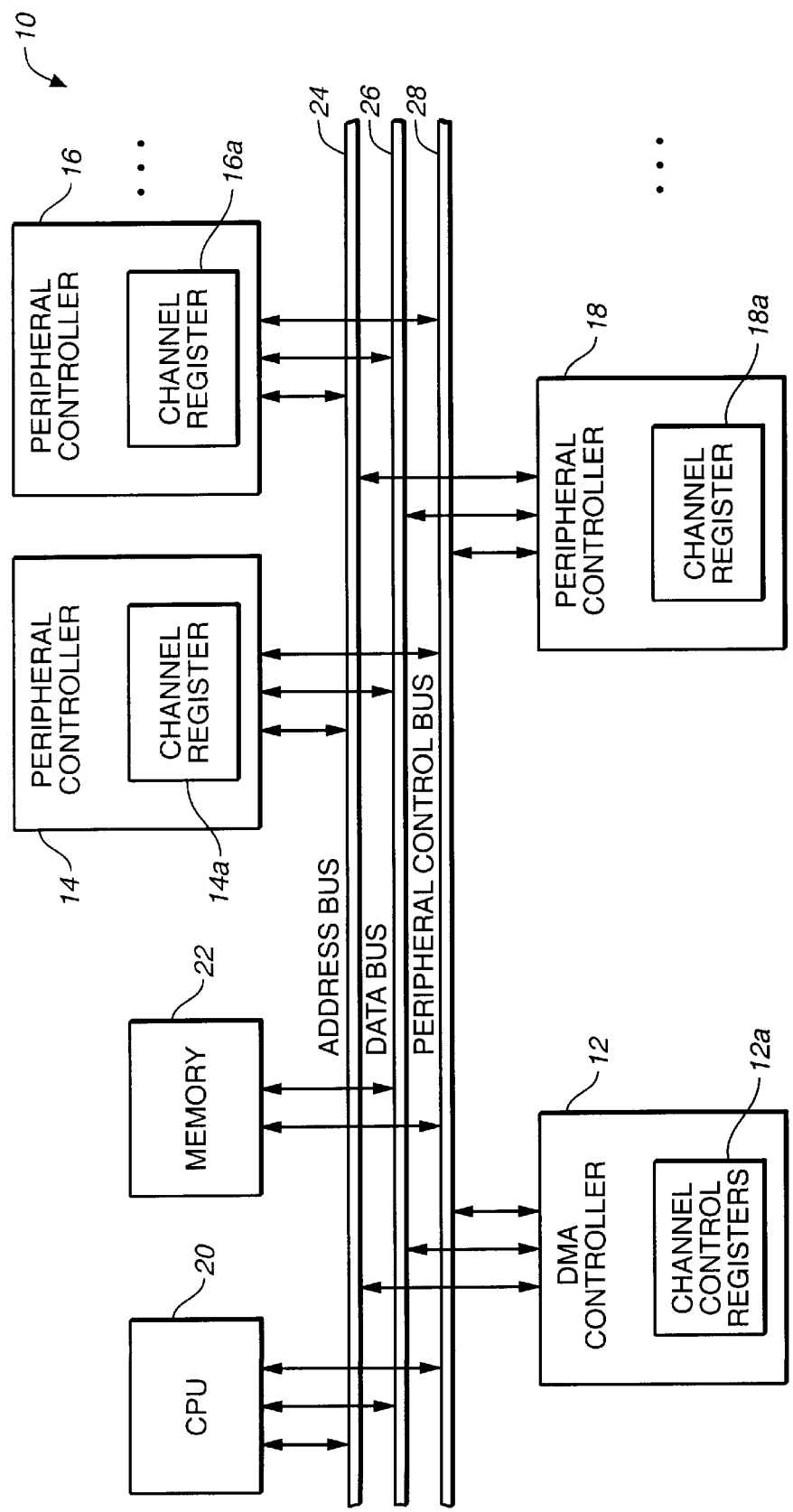
FIG._1

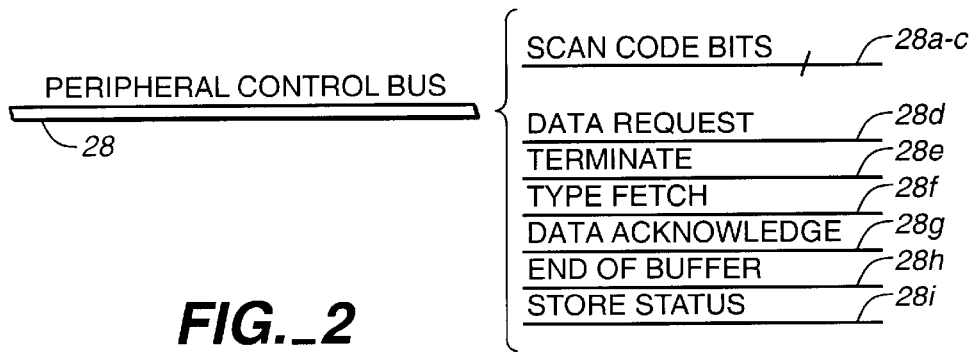
FIG._2
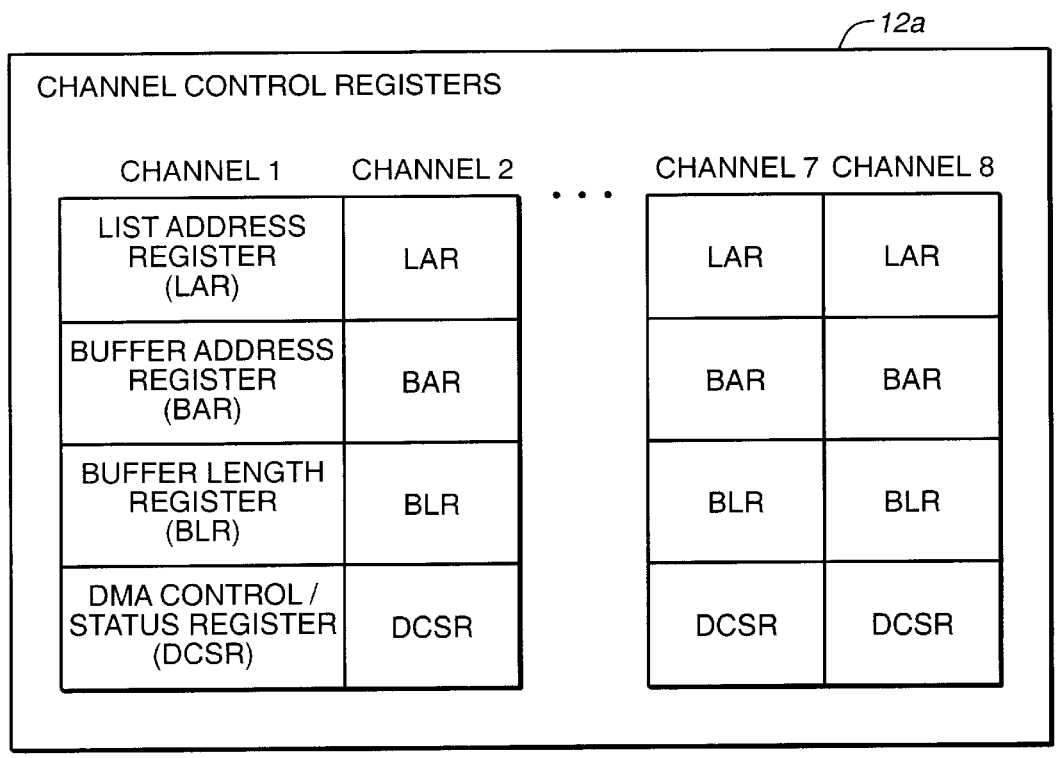
FIG._3
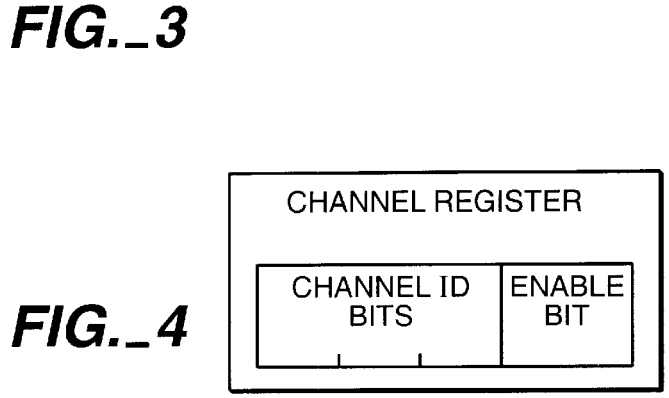
FIG._4

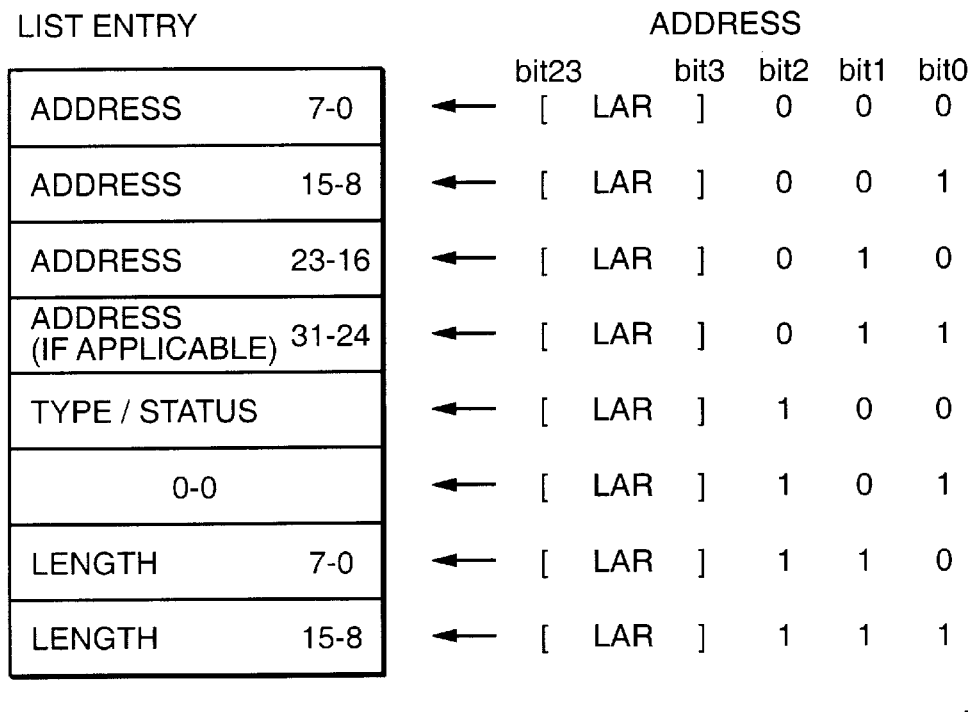

FIG._5A

TYPE / STATUS BYTE

- 00   END OF LIST
- 01   TRANSFER IN LIST
- 02   READY BUFFER, NO COMMAND, NO END OF BUFFER NOTIFICATION
- 03   READY BUFFER, NO COMMAND, NOTIFY DEVICE AT END OF BUFFER
- 04   BUFFER IN PROGRESS
- 05   COMPLETED BUFFER (NO STATUS)
- 06-3F   INVALID CODES
- 40-7F   READY BUFFER, WITH COMMAND, NO END OF BUFFER NOTIFICATION
- 80-BF   READY BUFFER, WITH COMMAND, NOTIFY DEVICE AT END OF BUFFER
- C0-FF   COMPLETED BUFFER (WITH STATUS)

FIG._5B

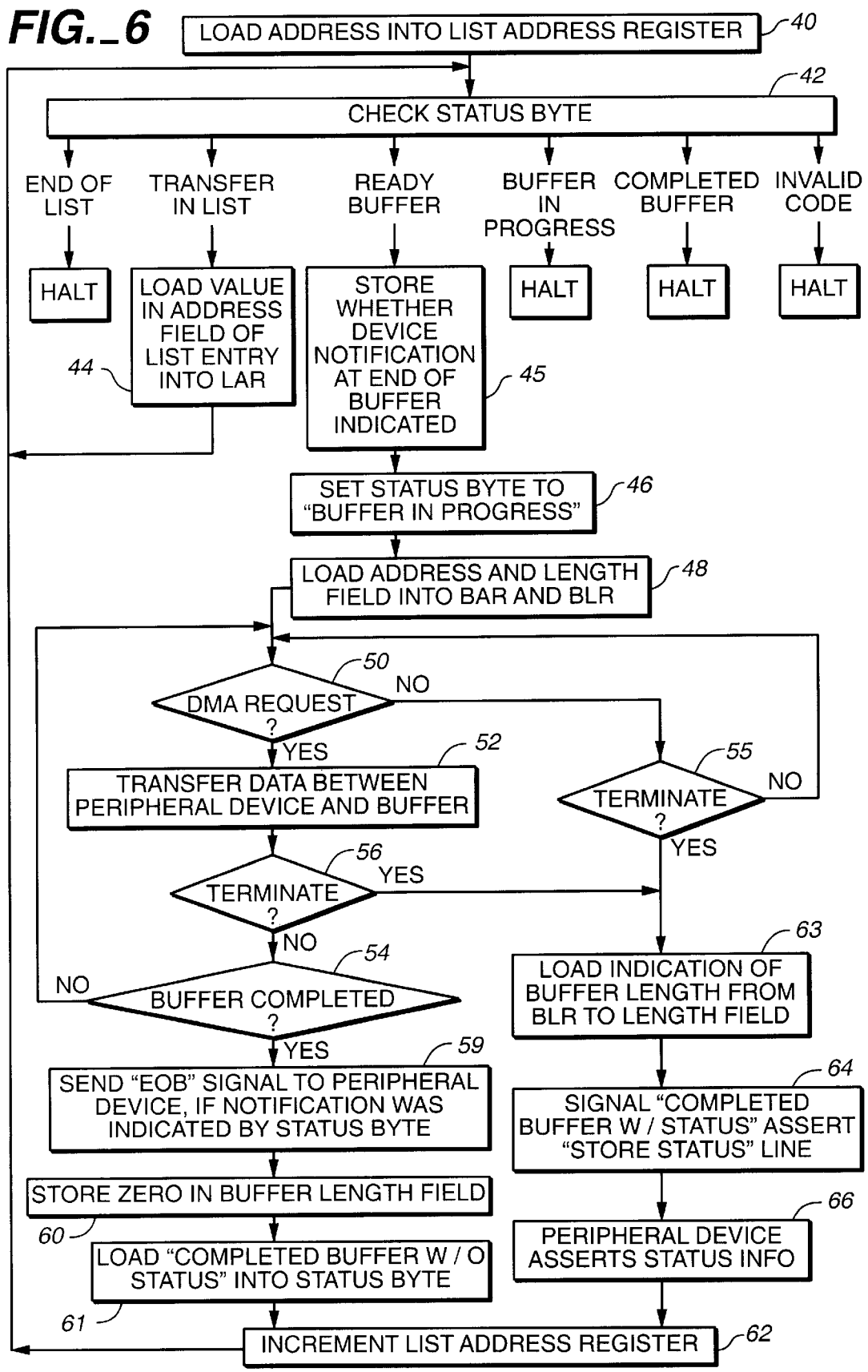

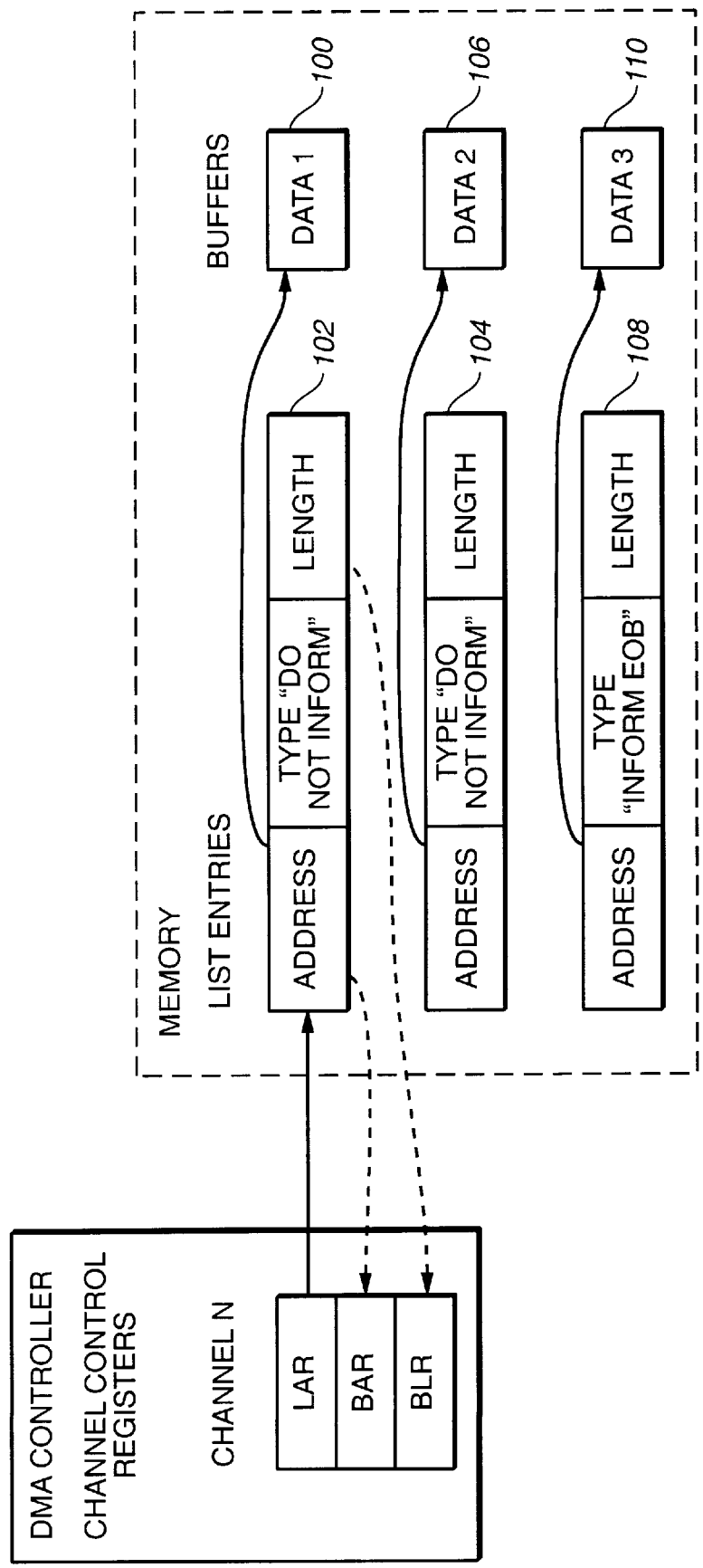
FIG._7

DMA WITH DYNAMICALLY ASSIGNED CHANNELS, FLEXIBLE BLOCK BOUNDARY NOTIFICATION AND RECORDING, TYPE CODE CHECKING AND UPDATING, COMMANDS, AND STATUS REPORTING

BACKGROUND OF THE INVENTION

The present invention relates to direct memory access (DMA) systems.

Direct memory access is a way of transferring data between a peripheral device and a memory. During direct memory access transfer, the central processing unit (CPU) is idle and does not have control of the memory buffers. A direct memory access controller takes over the buses to manage the transfer directly between the peripheral device and the memory.

Typically, the CPU initializes the DMA by sending the starting address of the memory block where the data is available or the data is to be stored, a count value indicating the length of the memory block, a control specifying the mode of transfer such as read or write, and a control to start the DMA transfer. The DMA controller stores the starting address in a buffer address register, the count in a buffer length register, and the control information in a control register.

In the DMA transfer, the DMA controller uses DMA request lines from a peripheral device to the DMA controller and DMA acknowledgement lines from the DMA controller to the peripheral devices. A peripheral device sends the DMA request to the DMA controller, and when the peripheral device receives the DMA acknowledgement, puts data on a data bus for a write, or captures data from the data bus for a read. The peripheral unit can, in this way, communicate with the memory through the data bus for direct transfer between the units while the CPU is momentarily disabled.

For each datum that is transferred, the DMA increments its address register and decrements the word count register. If the word count does not reach zero, the DMA checks the DMA request line from the peripheral. For so-called "burst mode" devices, the line may remain active as the previous transfer is completed. A second transfer is then initiated, and the process continues until the entire block is transferred. Alternately, the DMA request may be negated and then re-asserted somewhat later. In this case, the DMA disables the bus request line so that the CPU can continue to execute the program. When the peripheral device requests data transfer, the DMA requests the data bus again. If the count register reaches zero, the DMA stops any further transfer and removes the bus request. It also informs the CPU of the termination. The CPU can read the count register. A zero value of the count register indicates that all data in the buffer was transferred successfully.

Some DMA controller systems use list entries in memory rather than having the CPU unit write the buffer information into the DMA controllers. The list entry typically includes the starting address and count of a buffer, also located in the memory. The CPU can initialize the DMA by putting the location of the list entry into a list address register. The DMA controller then loads the address contained in the list entry to a buffer address register, and the count contained in the list entry into a buffer length register. Additionally, the list entry can include a link to another list entry, which allows for buffers arranged in a linked list or buffer ring.

The DMA controller may have more than one channel. Each channel has its own address register and word count register within the DMA controller. Recently, the number of peripheral devices typically integrated with a microprocessor has increased. For this reason, it is undesirable to have a DMA channel for each of the input-output (I/O) devices. Heath et al. U.S. Pat. No. 4,901,234, entitled "Computer System Having a Programmable DMA Controller," describes a system in which the number of peripherals greater than the number of DMA channels can have DMA access. Some of the DMA channels are dedicated to certain peripherals, while others, termed programmable DMA channels, are shared by the remaining peripherals. Each peripheral having DMA access has a channel priority value. When the peripheral wants DMA access, it transmits the channel priority value onto an arbitration bus. A disadvantage of this system is that this DMA arbitration system is somewhat complicated.

It is desired to have an improved DMA controller system that avoids some of the problems in the prior art.

SUMMARY OF THE INVENTION

One embodiment of the present invention uses channel registers at the peripheral controllers. The channel registers identify the channel associated with the peripheral controller, as well as an enable bit. For each DMA channel, only the peripheral controller with its enable bit set to active will be able to access the DMA channel. The DMA controller sets the scan code lines of a peripheral control bus to indicate the currently active DMA channel. Peripheral controllers can check whether the current channel is the same as the one assigned to the peripheral controller, and if a peripheral matches this value and its enable bit is set, can request the DMA transfer. An advantage of this system is that the DMA acknowledge line, DMA request line and other lines can be part of the peripheral control bus connected to each of the peripheral controllers. Only the currently active DMA channel and peripheral controller will use these bus lines. Bussing these signals is more advantageous than having individual data acknowledge and data request lines for each peripheral device.

Additionally, the DMA controller system in the present invention has advantages over the prior art in that it uses a status field of the list entries in a more capable and efficient manner than has been done in prior DMA controllers.

For example, the DMA controller of the present invention checks the status field of each list entry before processing a buffer. Only certain values of the status field indicate that the DMA controller should process the buffer. Other values of the status field cause the DMA operation to stop. In a preferred embodiment, the status field needs to be a value indicating a "ready buffer" before data will be read out or written into the corresponding buffer. One problem that can occur with prior art systems is that, if a transient malfunction causes an incorrect value to be loaded into the list address register pointing to an incorrect memory location, the DMA controller will interpret the data at the incorrect memory location as pointing to a buffer at another memory location. Since no checking is done in the prior art system, the DMA controller can overwrite memory locations, potentially causing a system crash. In a preferred embodiment, the status field values of all "zeros" and all "ones" are among those values that cause the DMA controller to halt processing of the DMA transfer. One embodiment of the present invention uses a "buffer-in-progress" code. The "buffer-in-progress" value of the status field will prevent the DMA controller from processing a buffer when another channel is processing the buffer. The DMA controller, once it fetches the status field from the list entry, will write the "buffer-in-progress" value into the status field so that no other channel can access the buffer.

Additionally, the status field can also have codes which indicate whether a notification of the "end of the buffer" is to be sent to the peripheral device. This allows for multiple memory buffers to be used to produce a data block. For all but the last buffer of the block, no notification of the "end of buffer" is given. In this way, the data for the block can be contained in multiple buffers in different locations of the memory. The block of data need not be located in a single buffer. This allows for the peripheral device to be notified of the end of a block of data without tying the notification to each and every memory buffer boundary.

The status field can also include command information. In a preferred embodiment, this command information can be sent to the peripheral device using a command line in the peripheral control bus. Whenever the DMA controller fetches the type/status byte of a buffer descriptor, it will drive the command signal high. The peripheral devices that handle commands will then respond to the command line by decoding some of the bits of the data bus. Some of the values of the status fields will have command information, which can be captured by the peripheral device. The command information does not have to be included with every buffer. In some applications, the command information stays the same for all the buffers. For this reason, the DMA controller of the present invention defines a separate type/status byte code for a "ready buffer without command."

Another embodiment of the present invention concerns status reporting. It is desirable to have I/O peripheral devices and DMA channels continue to operate and transfer arbitrarily many buffers of data without immediate processor attention between the buffers or blocks of data on the media. In order to do this, it is typically necessary to store the status of the client I/O peripheral device at certain times. The two most common requirements for devices that handle data transfers are to indicate an "overrun," in which an input device was not read often enough by the DMA channel to prevent loss of data, and an "underrun," in which the applicant device was not written to often enough to supply data at the rate needed by the medium. In one embodiment of the present invention, when the peripheral device asserts a terminate line, the DMA channel will write a "completed buffer with status" code back into the status field of the list entry. In response to a store status signal, the peripheral device can drive some of the lines of data bus with a status associated with the buffer being terminated. In this way, the peripheral device can indicate a data underrun, a data overrun, CRC error, or similar status, in the status field of the list entry for a buffer. The status field can later be interpreted by the CPU.

An additional embodiment of the present invention concerns flexible block boundary recording for input devices. Input devices generally transfer data in blocks, and sometimes it is necessary or desirable to maintain the block boundary as received by the buffers. The present invention uses a terminate line in the peripheral control bus to do this. If the terminate signal is given by the peripheral device, the value in the buffer length counter of the DMA controller will be loaded into the list entry and no more data placed into the current buffer. The DMA controller of the present invention does not require that memory buffers contain the entire block transferred from the input device. The DMA controller can store a "completed buffer w/o status" code when a buffer is completed without a terminate signal. After the data is read into the multiple buffers, the CPU can interpret the list entries associated with the buffers to indicate that a block of data is contained in the buffers. There is no requirement that a block of data be stored in a continuous section of memory.

BRIEF DESCRIPTION OF THE DRAWINGS

The above and other features and aspects of the present invention will be more apparent upon reading the following detailed description in conjunction with the accompanying drawings.

FIG. 1 is a diagram of a system using a DMA controller and peripheral controller with channel register.

FIG. 2 is a diagram of a peripheral control bus used in an embodiment of the present invention.

FIG. 3 is a diagram of channel control registers of the DMA controller in one embodiment of the present invention.

FIG. 4 is a diagram of a channel register of peripheral controllers for an embodiment of the present invention.

FIG. 5A is a diagram of the list entry structure of memory of the present invention.

FIG. 5B is a list of the different type/status codes for one embodiment of the present invention.

FIG. 6 is a flow chart illustrating the data transfer between a peripheral device and the buffer in an embodiment of the present invention.

FIG. 7 is a diagram illustrating the data transfer from buffers.

DETAILED DESCRIPTION OF THE PREFERRED EMBODIMENT

FIG. 1 is a diagram of a system 10 including a DMA controller 12 and peripheral controllers 14, 16 and 18. The peripheral controllers 14, 16 and 18 have channel registers 14a, 16a and 18a. This system 10 also includes a CPU 20 and memory 22. An address bus 24 and data bus 26 interconnect the CPU 20, DMA controller 12, memory 22 and the peripheral controllers 14, 16 and 18. Additionally, a peripheral control bus 28 is connected between the DMA controller 12 and the peripheral controllers 14, 16 and 18.

FIG. 2 shows a diagram of a peripheral control bus 28. In a preferred embodiment, the peripheral control bus 28 includes a plurality of lines 28a–c, which carry the scan codes for the DMA channel currently active. In one embodiment, the scan code lines are carried on three lines and define eight channels. If more than eight DMA channels are used, additional scan code lines may be used in the peripheral control bus.

FIG. 4 is a diagram showing a channel register which is a part of a peripheral controller. The channel register has a plurality of bits to indicate the DMA channel associated with the peripheral device. Additionally, the channel register has an enable bit which indicates whether the peripheral device is able to access the DMA channel. The peripheral device controller compares the channel assignments in the channel ID bits with the scan code on the peripheral control bus lines 28a–c. If these bits match, and the enable bit is set, the peripheral controller requests attention from the DMA using the data request line 28b.

In a preferred embodiment, there are twelve peripheral controllers associated with the system and only eight channels. This allows for the dynamic assignment of DMA channels to any of the input/output peripheral devices while the system is operating.

The DMA enable bit and channel ID bits of the I/O device can be set by the central processing unit. This is done on a "first come, first served" basis or whatever other allocation method is done by the CPU software.

Looking again at FIG. 1, once the DMA controller 12 is enabled, it starts scanning through the DMA channels by successively placing values for each channel onto the scan lines. If a peripheral device's channel register ID bits match the scan code and the peripheral device's DMA enable bit is set, the device responds to the match by driving the data request line 28d. If the device needs to transfer data, the peripheral device responds by driving the data request line 28d high, otherwise the peripheral device drives the data request line 28d low. Once the DMA controller receives a data request, the DMA controller stops scanning, and services the peripheral device. The DMA controller first requests bus control from the CPU. When it receives control, it places the current buffer address for this channel on the system bus, drives the system bus control signals to indicate a memory read or write operation as appropriate, and drives the data acknowledge line 28g of the peripheral control bus 28 high. The peripheral device responds to the data acknowledge by either placing data on the data bus for writing into the memory, or capturing the data on the data bus from the memory. The data transfers continue as long as the device asserts the data request and buffers are available.

Looking at FIG. 2, the scan code on the peripheral control bus allows for the other lines of the bus to be shared. For example, a separate data request line and data acknowledge line need not be provided for each peripheral controller. In the preferred embodiment, the peripheral control bus includes additional lines including a terminate line 28e, a type fetch line 28f, an "end of buffer" line 28h and a store status line 28i.

FIG. 3 is a diagram illustrating the register set for each channel of the DMA controller. In a preferred embodiment, there are eight DMA channels, each of the DMA channels including a list address register (LAR), a buffer address register (BAR), a buffer length register (BLR) and a DMA controller/status register (DCSR). The list address register indicates the address of the current list entry. The list address register is preferably the same width as the system address bus, omitting the 3 least significant bits, and contains the base address of the current list entry. The DMA channel begins operation when the CPU writes the last byte of the register. The three least-significant bits of the LAR are ignored in writing, and always read back as 100, pointing to the current type/status byte of the list entry.

The DMA controller loads the address of the start of the current buffer into the buffer address register from the address field of the current list entry. At the end of each data transfer, the DMA channel increments the buffer address register by one. The DMA controller loads the length of the current buffer into the buffer length register from the buffer length field of the current list entry. At the end of each data transfer, the DMA channel decrements the buffer length register by one. The DMA control/status register controls items such as the input/output direction, enabling/disabling, and burst mode. It also provides other DMA channel and interrupt status conditions.

FIG. 5A is a diagram of the list entry structure used with a preferred embodiment of the present invention. The DMA channel starts operating when the software loads an address into its list address register (LAR). This sets the DCSR's run bit. The channel then makes a bus access request to the processor. When the processor grants the bus access, the DMA channel proceeds to access the list entry indicated by the LAR. The list entries always begin at an eight-byte boundary, that is, an address having as the least-significant three bits (000). The format of the list entries is as follows. The first three or four bytes give the address of the buffer, the fifth byte gives the type/status indication, and the seventh and eighth bytes contain the buffer length information. As is described below, typically, when an address is written into the list address register, the DMA controller fetches the type/status byte from the first entry of the list, then fetches the address and puts it into the buffer address register. Next, it fetches the buffer length from the last two bytes, puts that value into the buffer length register, and then proceeds to process to the buffer.

FIG. 5B is a list of the codes of the type/status byte of each list entry used in a preferred embodiment of the present invention.

FIG. 6 is a flow chart illustrating the operation of the data transfer between a peripheral device and a buffer with the DMA controller. The DMA controller knows whether a peripheral device connected to a specific channel is receiving or transmitting data based upon the DMA control/status register value for that channel. In step 40, an address is loaded into the list address register of the DMA controller by the CPU software. In step 42, the status byte for the list entry pointed to by the list address register is checked. If the status byte indicates the end of a list, the operation halts.

If the status byte indicates a "transfer in list," the value in the address field of the list entry is loaded into the list address register. In this way, a link between list entries in non-contiguous locations of memory can be done. Additionally, this "transfer in list" could be used to form a buffer loop by having the last list entry in the loop point to the first list entry in the loop.

If the status byte is a "buffer in progress" or "completed buffer," the DMA stops processing. Some prior DMA controllers using list entries have the problem that they interpret almost any data as a valid buffer descriptor. Should a buffer descriptor be damaged in some way, such as in a power supply surge, or due to a software problem, such DMA controllers can act on the memory in uncontrolled fashion, transferring data to and from unintended places and potentially crashing the microprocessor software. By having the status check step 42, the present invention can avoid most of these difficulties. There is a limited set of valid codes that indicate a "ready buffer" or a "transfer in list." If a DMA channel fetches any other code, the DMA controller clears the run bit, suspends operation, and can be programmed to interrupt the microprocessor. In the embodiment shown in FIG. 6, the "end of list" value, the "buffer in progress" value, and the "completed buffer" value will cause the DMA to halt in this manner. Looking again at FIG. 5B, a substantial percentage of the status byte codes indicate buffers that should not be processed by the DMA controller. In particular, the values of all "zeros" and all "ones" indicate buffers that would not be processed by the DMA controller of the present invention.

Looking again at FIG. 6, if the status byte is a value indicating a "ready buffer," the system proceeds to operate on the buffers. In step 45, the DMA controller stores whether device notification of an "end of buffer" is to be given after the buffer is completed in step 59 discussed below. In step 46, the status byte of the list entry corresponding to the buffer is set to "buffer in progress." This will prevent any other DMA channel from processing the buffer. In step 48, the address and length fields of the list entry are loaded into the buffer address register and the buffer length register, respectively.

Once a DMA channel has fetched a list entry, it does nothing further unless/until the current peripheral device asserts a data request or terminates. When the client device does so, the DMA channel requests bus access from the processor. If there is a DMA request, the DMA channel will assert the data acknowledge to the peripheral device. At the same time, the DMA channel places the address in its buffer address register on the address bus, and sets the control signals for a memory read or write per the input/output bit in the channel's DMA control status register (DCSR). Depending upon the data direction, the data acknowledge will make the device either provide a byte of data on the data bus, or capture a byte of data from the data bus. In FIG. 6, the data is transferred between the peripheral device and the buffer in step 52.

At the end of each data transfer, the DMA channel increments the buffer address register by one, and decrements the buffer length register by one. Step 54 tests to see whether the buffer is completed. Step 56 tests whether the terminate signal has been received. If the device signals a data request, but not terminate and the buffer length register has not been counted down to zero, the DMA channel checks the data request again. In a preferred embodiment, the device checks whether a burst bit in the channel's DCSR is set. If the burst bit is zero, and/or the device negates the data request, the channel gives the bus back to the CPU. In step 56, if the device signals a data request but not a terminate, and the buffer length register has counted down to zero (indicating that the buffer is full), the DMA channel puts the address of the type/status byte from the LAR onto the address bus, and writes the code for "completed buffer w/o status" in that byte in step 61. Additionally, if the DMA channel's register indicates an "interrupt for all buffers" or an "interrupt for notify buffers" and this is such a buffer, the DMA controller sets a bit to request an interrupt. Next, in step 62, the DMA controller increments the LAR to the address of the following list entry, and goes back to fetch a new list entry from another address as described above.

If a terminate signal is received in step 56, in step 63, the entire contents of the buffer length registered are written back to the buffer length field of the entry. This value enables the software to tell how much data was actually written into or read out of the buffer. In step 64, the store status line is asserted, and a code for the "completed buffer with status" is placed upon the data line. In response to the store status, some of the lines of the data bus, preferably bits D5 to D0, can be driven by the peripheral device to store the status information in the status byte of the list entry. The DMA channel advances the LAR in step 62. The DMA controller then requests an interrupt unless DMA channel register indicates "no buffer interrupt." The DMA channel then goes back to fetch another list entry from the address in the list address register, as described above.

In step 59, an "end of buffer" signal is sent to the peripheral device, if such notification is indicated by the status byte. The use of the "end of buffer" signal by the peripheral device is device dependent. For example, a high-level data link control (HDLC) transmitter passes the "end of buffer" indication through its transmit FIFO and terminates the transmit frame after sending the data for which the DMA channel asserted the "end of buffer."

FIG. 6 illustrates some of the advantages of the present invention. For many of the output devices with which the DMA channels may be used, it is necessary to notify the device of boundaries in the data so that the peripheral device can implement the boundaries on its home medium. For example, an HDLC serial transmitter will send a cyclic redundancy check (CRC) flag after the transmitter has been notified of the data boundary, while a magnetic tape drive might write a CRC and inter-record gap, after being notified of the data boundary.

For some media, physical blocks may be comprised of more than one kind of data. For example, a typical HDLC block begins with some kind of address field indicating the destination of the block, and a control field indicating the type of block, before the data proper. It is often convenient for software to be able to locate the address and control field in one part of memory, and the data in another. Thus, it is operationally efficient to combine the contents of several memory buffers into one physical block on the peripheral device's medium. This, in turn, means that a strict correspondence, between the memory buffers and the physical block on the output medium, is not desirable.

The problem of notifying an output device of data boundaries, without tying this notification to every memory buffer boundary, is solved in the invention by coding the type bytes in each list entry with an indication of whether the peripheral device is to be notified at the end of that buffer.

Each time the DMA controller fetches a type byte before transferring into or out of a buffer, it decodes the type byte and stores in a DMA channel register whether it should notify the device at the end of the buffer. If notification is to be given, when the buffer length counter is decremented to zero, the DMA channel asserts the "end of buffer" signal together with a data acknowledge signal. The output device stores the "end of buffer" signal indication with the data, and after it has output the data, the peripheral device performs the appropriate action for the end of the block.

This concept is illustrated in FIG. 7. When data is loaded into the list address register, the DMA controller then fetches the type byte of list entry 102, which in this case is "ready buffer, do not notify at end of buffer." The address portion of the list entry is put into the buffer address register, and the length is placed in the buffer length register. This buffer address register now points to the data buffer "one," and the data in this buffer can be transferred out to the peripheral device. When the last datum in the data buffer is read out, no "end of buffer" signal is sent to the peripheral device. The LAR is then incremented to the next list entry from list entry 102 to list entry 104. The data buffer 106 is then processed. At the end of this procedure, no "end of buffer" is sent to the peripheral device. The LAR is incremented again to point to list entry 108. After the buffer length register counts down to zero for the data in buffer 110, since its type for the list entry is "ready buffer, notify at end of buffer," the end of buffer line is asserted.

In this way, the data in buffers 100, 106 and 110 will be treated by the peripheral device as a single block. The data in buffers 100, 106 and 110 can be located in different areas of the memory.

Another advantage of the present invention concerns flexible recording of block boundaries for input devices. It is often desirable for block boundaries on an input device to be detectable to the system software, long after the block of data has been received. Looking again at FIG. 6, the device of the present invention uses the Terminate line of the peripheral control bus. When a peripheral device drives Terminate high in step 55 or 56, the DMA channel will transfer data if the data request is asserted then, or immediately if Terminate is asserted alone, the DMA channel will store the value in the channel's buffer length counter back into the buffer length field of the list entry. In step 63, the status from the peripheral device is then stored in a "completed buffer w/status" code in the status field of the list entry. On the other hand, step 61 shows what happens when the buffer is completed without a terminate signal asserted. The value "completed buffer w/o status" is stored in the status field of the list entry in step 61, and the buffer length field of the list entry is written with all zeroes in step 60.

Typically, data from the peripheral device can be placed into multiple buffers, all except the final one for a received block showing their type/status byte written with a "completed buffer without status" status, until a Terminate signal is given. In this way, the CPU software can determine, from list entries, the boundaries of the input data sent by the peripheral device without requiring such a block of data to be stored in only one buffer.

An additional feature of the present invention includes the use of information in the status bytes to indicate commands. A peripheral device often needs control information that can change from one buffer to the next. For example, a high-level data link control (HDLC) transmitter needs to know whether to compile a CRC and append it to each frame, and how many of the bits in the last byte of the frame should be sent, that is, the length of the frame down to the bit level. On the other hand, if the control information is always the same for all the buffers and the media blocks, it is an unnecessary burden for the system software to have to provide the same information with every buffer.

In the present invention, the DMA channels provide for such control command information, in a consistent way for all the devices with which they can be used. A Command line is provided on the peripheral control bus. When the DMA controller processes a list entry having a status code "ready buffer w/command," the DMA channel drives the Command signal high. The peripheral devices can respond to the command signal by capturing some of the bits of the status byte on the data bus.

In a preferred embodiment, the type codes for a "ready buffer with command" are defined in the range 40-BF hexadecimal. If the peripheral device that uses this feature sees Command line high, and bits D7-6 of the data bus are either 01 or 10, the peripheral device can then capture up to six bits of command information for the buffer from the data bus lines D5-0.

The CPU software is freed from having to provide such command information with every buffer, because a separate type code is provided for a "ready buffer w/o command." In many applications, the command information will stay the same for all the buffers. The "ready buffer w/o command" code has data buffer bits D7-6 both zero, so the device will not capture the command information from data buffer bits D5-0. The peripheral device will then use the command information from the last buffer sent. In this way, the CPU software is not forced to store the command information in each buffer.

Another aspect of the present invention involves status reporting. It is desirable to have peripheral devices and the DMA channels continue to operate and transfer arbitrarily many buffers of data, without immediate processor attention between the buffers or blocks of data on the medium. In order to enable such operation, it is typically necessary to store the status of the client peripheral device at certain times. Two requirements that are common to any devices that handle or require continuous data transfer are data "overruns" in which the input device is not read often enough by the DMA channel to prevent loss of data, and data "underruns" in which the output device was not written to often enough by the DMA controller to supply data at the rate needed by the medium.

As an example of status reporting requirements, an HDLC receiver, in addition to overrun, needs to record for each frame whether a frame was CRC-correct, whether it was terminated by a Flag or an Abort sequence, and how many bits in the last character stored were actually received, which is to say the length of the frame in bits modulo 8.

The DMA channel of the present invention provides for status reporting in a consistent way for all the devices with which it can be used, in the same way it provides for decoding block boundaries on the medium. This is done with the terminate and source status lines in the peripheral control bus, and the status field of the list entry. As discussed above, when a device terminates a buffer by asserting the terminate line, a "completed buffer" code including status information from the peripheral device is stored in the status field of the list entry associated with the buffer. The CPU can later interpret the status information.

Various details of the implementation and method are merely illustrative of the invention. It will be understood that various changes in such details may be within the scope of the invention, which is to be limited only by the appended claims.

What is claimed is:

1. An apparatus comprising:
   a DMA controller including a number of DMA channels;
   a control bus operably connected to the DMA controller; and
   peripheral device controllers connected to the DMA controller through the control bus, the peripheral device controllers each having a register arranged to store a channel number and an indication whether the peripheral device is enabled, wherein the control bus includes lines to indicate which DMA channel is currently operative.

2. The apparatus of claim 1, wherein the DMA controller cycles the channel values on the control bus.

3. The apparatus of claim 2, wherein the control bus includes a DMA request line connected to the peripheral controllers, the peripheral controllers determining, based on the DMA channel information on the control bus, which peripheral controller has access to the DMA request line.

4. An apparatus comprising a DMA controller and a memory, the DMA controller having registers including a list address register, the list address register adapted to store the memory location of a list entry, wherein the list entry is structured to include an address field, a length field and a status field, wherein for at least some of the values of the status field, the address field indicates a location of an associated buffer in the memory, wherein the DMA controller is adapted to modify the contents of the status field after the associated buffer is processed, the DMA controller further adapted to check the value of the status field before operating on an associated buffer.

5. The apparatus of claim 4, wherein at least one "ready buffer" value of the status field indicates that the buffer is ready to be operated upon.

6. The apparatus of claim 4, wherein at least one "buffer in progress" value of the status field indicates that the buffer is already being operated upon and the DMA controller is adapted to set the value of the status field to "buffer in progress" before processing the associated buffer.

7. The apparatus of claim 4, wherein at least one "buffer complete" value of the status field indicates that the buffer has finished operating on the buffer.

8. The apparatus of claim 4, wherein at least one value of the status field indicates that there are no more list entries to process.

9. The apparatus of claim 4, wherein at least one value of the status field indicates that the value of the buffer address field points to another list entry.

10. The apparatus of claim 4, wherein at least some values of the status field indicate that the buffer should not be operated on.

11. An apparatus comprising a DMA controller and a memory, the DMA controller having registers including a list address register, the list address register adapted to store the memory location of a list entry, wherein the list entry is structured to include an address field, a length field and a status field, wherein for at least some of the values of the status field, the address field indicates a location of an associated buffer in the memory, wherein the DMA controller is adapted to modify the contents of the status field after the associated buffer is processed, the DMA controller further adapted to check the value of the status field before operating on an associated buffer, wherein at least some values of the status field indicate that the buffer should not be operated on, wherein said at least some values include bytes constructed of all logical "ones" and bytes constructed of all logical "zeros."

12. An apparatus comprising a DMA controller and a memory, the DMA controller having registers including a list address register, the memory including list entries arranged to include an address field, a length field and a status field, the list address register adapted to store a memory address pointing to one of the list entries, wherein for at least some of the values of the status field, the address field indicates the location of an associated buffer in the memory, wherein when more than one of such buffers contain data for a block of data to be sent to a peripheral device, the DMA device is adapted to transfer the data by processing a number of buffer areas associated with a number of list entries, wherein the status field of the list entry associated with the last buffer in the block contains an indication that notification of the end of the block is to be sent to the peripheral device.

13. The apparatus of claim 12, wherein a control bus connects the DMA controller and a peripheral device, one of the lines of the control bus being an indication of "end of block."

14. The apparatus of claim 12, wherein the status field of the list entries associated with the buffers that are not the last buffer in the block contain values indicating that the peripheral device is not to be notified of an "end of block."

15. The apparatus of claim 14, wherein the DMA controller includes a number of DMA channels; the peripheral device controlled by peripheral device controllers connected to the DMA controller through the control bus, the peripheral device controllers each having a register arranged to store a channel number and an indication whether the peripheral device is enabled, and wherein the control bus includes lines to indicate which DMA channel is currently operative.

16. An apparatus comprising a DMA controller and a memory, the DMA controller having registers including a list address register, the memory including list entries arranged to include an address field, a length field and a status field, the list address register adapted to store a memory address pointing to one of the list entries, wherein for at least some of the values of the status field, the address field indicates a location of an associated buffer in the memory, wherein the DMA controller is adapted to store a block of data from a peripheral device into more than one buffer such that, as long as no terminate signal is received, each buffer is filled with data, but when a terminate signal is received from the peripheral device indicating the end of a block, only the remaining data for that block is stored in the buffer, and if more data is being sent a new buffer is used.

17. The apparatus of claim 16 wherein, if a buffer is filled with data without the DMA controller receiving a terminate signal, a "completed buffer without status" is stored in the status field and wherein, if a terminate signal is received, a completed buffer with status information from the peripheral device is stored.

18. The apparatus of claim 17, wherein the status information is put on some of the lines of the data bus by the peripheral device, to be stored in the status field.

19. The apparatus of claim 16 wherein the DMA controller registers include a buffer address register and a buffer length register.

20. The apparatus of claim 18 wherein, after the terminate signal is received, the DMA controller is adapted to store back into the length field of the list entry, the value in the buffer length register, so as to indicate the amount of valid data stored in the last buffer.

21. An apparatus comprising:
a DMA controller including a list address register;
a control bus operably connected to the DMA controller, the control bus having a command line;
a memory;
a data bus operably connected to the DMA controller and memory;
peripheral device controllers connected to the DMA controller through the control bus and the data bus, wherein the memory includes list entries arranged with an address field, a length field and a status field, the list address register adapted to store a memory address pointing to one of the list entries, wherein for at least some of the values of the status field, the address field indicates the location of an associated buffer in the memory, wherein the DMA controller is adapted to send a signal on the command line when the information from the status field is read from memory over the data bus, the data in the status field being such that the peripheral controller can determine from the status byte data on the data bus whether command information is being sent to the peripheral controller, wherein if command information is not sent in the status data, the command information of the peripheral device is not changed.

22. An apparatus comprising:
a DMA controller including a list address register;
a control bus operably connected to the DMA controller, the control bus having a store status line;
a memory;
a data bus operably connected to the DMA controller and memory;
peripheral device controllers connected to the DMA controller through the control bus and the data bus, the memory including list entries arranged to include an address field, a length field and a status field, the list address register adapted to store a memory address pointing to one of the list entries, wherein for at least some of the values of the status field, the address field indicates the location of an associated buffer in the memory, wherein when the store status line is asserted, this indicates that the status field of a list entry is being written into memory by the DMA controller, and the peripheral controller can drive status data onto the data bus, to be stored in the status field of the list entry.

23. An apparatus comprising:
a DMA controller including a list address register;
a control bus operably connected to the DMA controller, the control bus having a store status line;

a memory;

a data bus operably connected to the DMA controller and memory;

peripheral device controllers connected to the DMA controller through the control bus and the data bus, the memory including list entries arranged to include an address field, a length field and a status field, the list address register adapted to store a memory address pointing to one of the list entries, wherein for at least some of the values of the status field, the address field indicates the location of an associated buffer in the memory wherein when the store status line is asserted, this indicates that the status field of a list entry is being written into memory by the DMA controller, and the peripheral controller can drive status data onto the data bus, to be stored in the status field of the list entry, wherein when a peripheral device asserts a terminate line, the DMA controller places the signal on the store status line in response to the peripheral device asserting a terminate signal.

* * * * *